(12) United States Patent
Kobayashi et al.

(10) Patent No.: US 10,802,370 B2
(45) Date of Patent: Oct. 13, 2020

(54) VEHICLE OPTICAL VIEW-SHIELDING STRUCTURE

(71) Applicant: Toyota Jidosha Kabushiki Kaisha, Toyota-shi, Aichi-ken (JP)

(72) Inventors: Atsuko Kobayashi, Nagoya (JP); Noritaka Toyama, Anjo (JP); Keiko Nagatomi, Toyota (JP); Keisuke Ito, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 56 days.

(21) Appl. No.: 16/229,803

(22) Filed: Dec. 21, 2018

(65) Prior Publication Data

US 2019/0243171 A1 Aug. 8, 2019

(30) Foreign Application Priority Data

Feb. 5, 2018 (JP) .................. 2018-018454

(51) Int. Cl.
| | |
|---|---|
| *G02F 1/137* | (2006.01) |
| *H04N 7/18* | (2006.01) |
| *G08B 3/10* | (2006.01) |
| *B60R 1/00* | (2006.01) |
| *B60Q 9/00* | (2006.01) |
| *B60R 11/04* | (2006.01) |
| *B60J 3/04* | (2006.01) |
| *B60R 11/00* | (2006.01) |

(52) U.S. Cl.
CPC ............ *G02F 1/137* (2013.01); *B60J 3/04* (2013.01); *B60Q 9/00* (2013.01); *B60R 1/00* (2013.01); *B60R 11/04* (2013.01); *G08B 3/10* (2013.01); *H04N 7/183* (2013.01); *B60R 2011/0026* (2013.01)

(58) Field of Classification Search
None
See application file for complete search history.

(56) References Cited

U.S. PATENT DOCUMENTS

| | | | | |
|---|---|---|---|---|
| 6,075,490 A | * | 6/2000 | Sakaguchi | ............... C03C 17/00 343/704 |
| 2005/0001901 A1 | * | 1/2005 | Eggers | ..................... B60R 11/04 348/118 |
| 2008/0197656 A1 | * | 8/2008 | Fujimoto | .................... B60J 1/02 296/84.1 |
| 2009/0027759 A1 | * | 1/2009 | Albahri | ..................... E06B 9/24 359/277 |
| 2009/0045647 A1 | * | 2/2009 | Whitlock | ............... B60J 1/2011 296/97.9 |

(Continued)

FOREIGN PATENT DOCUMENTS

JP H06297947 A 10/1994

*Primary Examiner* — Jayanti K Patel
*Assistant Examiner* — Stefan Gadomski
(74) *Attorney, Agent, or Firm* — Dinsmore & Shohl LLP (57) ABSTRACT

There is provided a vehicle optical view-shielding structure including: an optical view-shielding device that is capable of optically shielding a window when a vehicle is stationary, such that a vehicle interior is rendered difficult to see from outside the vehicle; an external detection device that detects an approaching object approaching the vehicle; and a notification device that issues a notification inside the vehicle notifying that the approaching object has been detected by the external detection device.

12 Claims, 7 Drawing Sheets

(56) References Cited

U.S. PATENT DOCUMENTS

| | | | | |
|---|---|---|---|---|
| 2011/0298988 | A1* | 12/2011 | Kawai | G06T 5/006 348/699 |
| 2012/0019891 | A1* | 1/2012 | Dewell | G02F 1/163 359/275 |
| 2012/0133769 | A1* | 5/2012 | Nagamine | G06T 7/246 348/148 |
| 2012/0140308 | A1* | 6/2012 | Cordova | B60J 3/04 359/244 |
| 2013/0054086 | A1* | 2/2013 | Lo | B60R 1/00 701/36 |
| 2014/0046505 | A1* | 2/2014 | Sakoda | G06F 3/041 701/2 |
| 2014/0064562 | A1* | 3/2014 | Mizutani | G06K 9/00805 382/103 |
| 2014/0103683 | A1* | 4/2014 | Giddens | B60J 1/2094 296/152 |
| 2014/0205147 | A1* | 7/2014 | Maruoka | G06K 9/00791 382/103 |
| 2014/0313502 | A1* | 10/2014 | Steele | E21B 7/022 356/4.01 |
| 2014/0320946 | A1* | 10/2014 | Tomkins | B60J 3/04 359/275 |
| 2015/0253594 | A1* | 9/2015 | Roberts | G02F 1/17 359/241 |
| 2015/0353003 | A1* | 12/2015 | Salter | B60Q 1/268 362/510 |
| 2015/0360565 | A1* | 12/2015 | Goto | B60R 1/00 701/36 |
| 2016/0052392 | A1* | 2/2016 | Terashima | B60K 37/02 359/601 |
| 2016/0089961 | A1* | 3/2016 | Nakamura | B60J 3/04 701/36 |
| 2016/0318379 | A1* | 11/2016 | Okuda | B60J 3/04 |
| 2016/0375828 | A1* | 12/2016 | Yun | B60S 1/0848 701/48 |
| 2017/0059896 | A1* | 3/2017 | Iwata | G02F 1/137 |
| 2017/0136854 | A1* | 5/2017 | Dunne | B60W 10/30 |
| 2017/0280063 | A1* | 9/2017 | Jeon | G06K 9/00791 |
| 2017/0355312 | A1* | 12/2017 | Habibi | B32B 5/28 |
| 2018/0043756 | A1* | 2/2018 | Kaphengst | H04L 63/062 |
| 2018/0079284 | A1* | 3/2018 | Choi | B60J 1/17 |
| 2018/0105101 | A1* | 4/2018 | Tatara | B08B 5/02 |
| 2018/0114079 | A1* | 4/2018 | Myers | G06K 9/00845 |
| 2018/0154908 | A1* | 6/2018 | Chen | G07C 5/0858 |
| 2018/0251069 | A1* | 9/2018 | LaCross | B60R 1/12 |
| 2018/0259804 | A1* | 9/2018 | Bae | H04M 1/725 |
| 2018/0306954 | A1* | 10/2018 | Koyama | G02B 5/208 |
| 2018/0314081 | A1* | 11/2018 | Hoggarth | G02F 1/0121 |
| 2019/0077313 | A1* | 3/2019 | Kanaguchi | B60R 1/12 |
| 2019/0098705 | A1* | 3/2019 | Salter | H05B 3/84 |
| 2019/0143925 | A1* | 5/2019 | Akamine | G01S 13/60 342/70 |
| 2019/0168586 | A1* | 6/2019 | Paepcke | B60N 2/002 |
| 2019/0212636 | A1* | 7/2019 | Stein | G03B 17/561 |
| 2019/0366811 | A1* | 12/2019 | O'Keeffe | B60W 40/02 |

* cited by examiner

VEHICLE OPTICAL VIEW-SHIELDING STRUCTURE

CROSS-REFERENCE TO RELATED APPLICATION

This application is based on and claims priority under 35 USC 119 from Japanese Patent Application No. 2018-018454 filed on Feb. 5, 2018, the disclosure of which is incorporated by reference herein.

BACKGROUND

Technical Field

The present disclosure relates to a vehicle optical view-shielding structure.

Related Art

Technology relating to an optical view-shielding device for vehicle window glass has been disclosed that includes a liquid crystal panel stuck to the surface of the vehicle window glass, a voltage application circuit for applying a control voltage to the liquid crystal panel, and a voltage application circuit switch installed to a driving seat in a vehicle cabin. The liquid crystal panel is switched between an optical view-shielding state and a transparent state by operating the switch (see Japanese Patent Application Laid-Open (JP-A) No. H06-297947).

However, in the related art described above, in cases in which the liquid crystal panel is stuck over the entire surface of the vehicle window glass and the liquid crystal panel is in the optical view-shielding state, not only is it difficult to see inside the vehicle from outside the vehicle, but it is also difficult to see outside the vehicle from inside the vehicle. It is therefore difficult for a person inside the vehicle to observe the situation outside the vehicle, which could conceivably cause the person inside the vehicle anxiety regarding the approach of other people or the like.

SUMMARY

An object of the present disclosure is to enable an occupant of a vehicle to feel at ease when utilizing the vehicle interior when the vehicle is stationary, without worrying about being seen by people outside the vehicle.

A vehicle optical view-shielding structure according to a first aspect includes an optical view-shielding device, an external detection device, and a notification device. The optical view-shielding device is capable of optically shielding a window when a vehicle is stationary, such that a vehicle interior is rendered difficult to see from outside the vehicle. The external detection device detects an approaching object approaching the vehicle. The notification device issues a notification inside the vehicle notifying that the approaching object has been detected by the external detection device.

In this vehicle optical view-shielding structure, the window is optically shielded by the optical view-shielding device when the vehicle is stationary, enabling the vehicle interior to be rendered difficult to see from outside the vehicle. Moreover, even though an occupant is unable to observe the situation outside the vehicle through the window, the external detection device is capable of detecting an approaching object approaching the vehicle, and the notification device is capable of issuing a notification inside the vehicle. Namely, it is possible to observe the situation outside the vehicle with respect to approaching objects even when the optical view-shielding device has been activated.

A stationary state of the vehicle is a state in which the vehicle is stationary and not ready to move. In cases in which the vehicle has an automatic transmission this refers to a state in which a shift lever is in a P range and a parking brake has been activated. In cases in which the vehicle has a manual transmission, this refers to a state in which the shift lever is in neutral, and the parking brake has been activated.

A second aspect is the vehicle optical view-shielding structure according to the first aspect, wherein the external detection device includes a camera that captures images outside the vehicle, from inside the vehicle, and the optical view-shielding device optically shields the window with the exception of an imaging range of the camera.

In this vehicle optical view-shielding structure, the camera serving as the external detection device detects an approaching object approaching the vehicle. The optical view-shielding device optically shields the window with the exception of the imaging range of the camera. This thereby enables an approaching object to be detected by the camera even in a state in which the window is being optically shielded by the optical view-shielding device.

A third aspect is the vehicle optical view-shielding structure of the first aspect or the second aspect, wherein the external detection device includes a motion sensor.

In this vehicle optical view-shielding structure, the motion sensor serving as the external detection device detects an approaching object approaching the vehicle.

A fourth aspect is the vehicle optical view-shielding structure of any one of the first aspect to the third aspect, wherein the notification device includes at least one of a warning sound generation section that issues a warning inside the vehicle or a warning display section that issues a warning inside the vehicle.

In this vehicle optical view-shielding structure, when an approaching object has been detected approaching the vehicle, notification can be issued inside the vehicle by at least one out of the warning sound generation section or the warning display section. In cases in which the external detection device includes a camera, an image of the approaching object can be displayed on the warning display section. Note that the warning sound generation section and the warning display section may be used individually, or may both be used in tandem.

The vehicle optical view-shielding structure of the first aspect enables an occupant of the vehicle to feel at ease when utilizing the vehicle interior when the vehicle is stationary, without worrying about being seen by people outside the vehicle.

The vehicle optical view-shielding structure of the second aspect enables an approaching object approaching the vehicle to be detected by a camera.

The vehicle optical view-shielding structure of the third aspect enables an approaching object approaching the vehicle to be detected by a motion sensor.

The vehicle optical view-shielding structure of the fourth aspect enables an occupant inside the vehicle to be clearly notified of the presence of an approaching object approaching the vehicle.

BRIEF DESCRIPTION OF THE DRAWINGS

Exemplary embodiments of the present disclosure will be described in detail based on the following figures, wherein.

DETAILED DESCRIPTION

Explanation follows regarding an exemplary embodiment of the present disclosure, with reference to the drawings. In the drawings, the arrow FR indicates the front of a vehicle, the arrow UP indicates the vehicle upper side, and the arrow RH indicates a vehicle right-hand direction.

As illustrated in FIG. 1, FIG. 2, and FIG. 4 to FIG. 7, a vehicle optical view-shielding structure S according to the present exemplary embodiment includes an optical view-shielding device 10, a camera 12 serving as an example of an external detection device, and a display 14 serving as a notification device.

Figure 1:
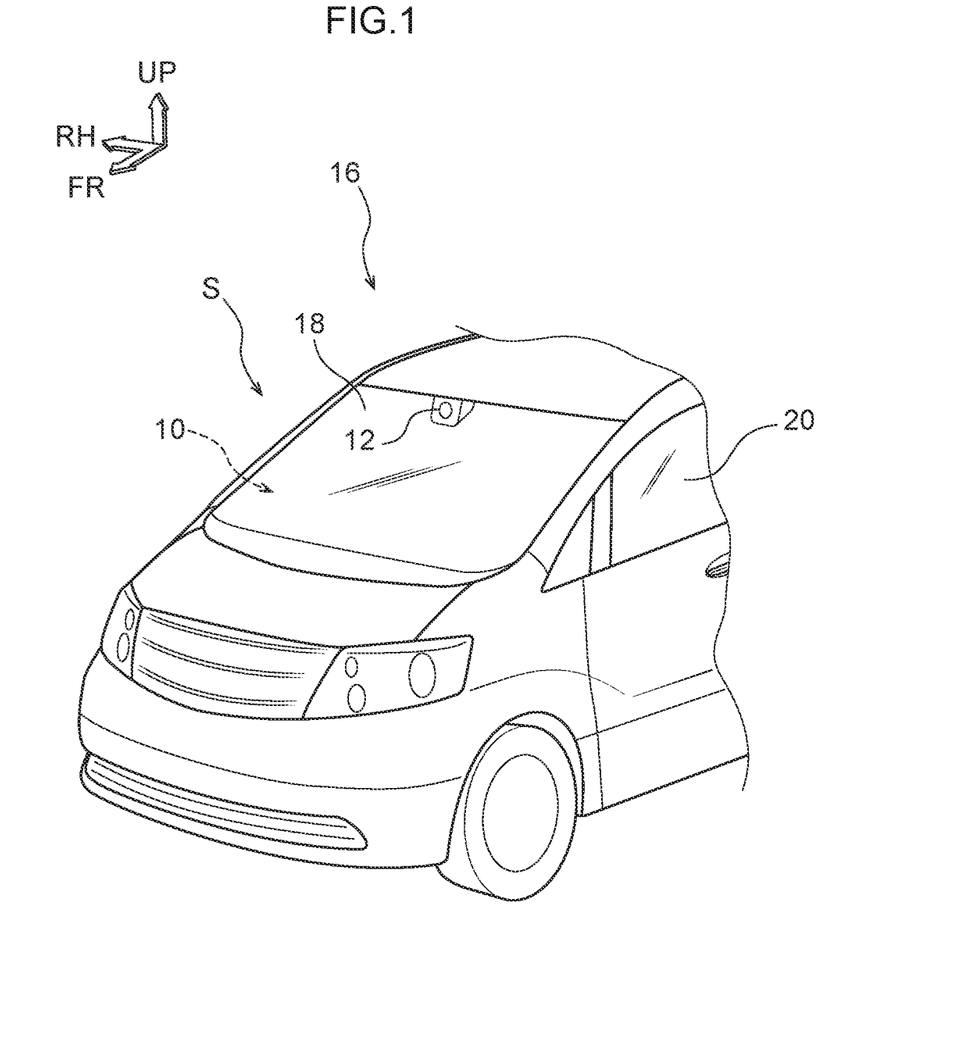
FIG. 1 is a perspective view illustrating a vehicle including a vehicle optical view-shielding structure according to an exemplary embodiment.
Figure 2:
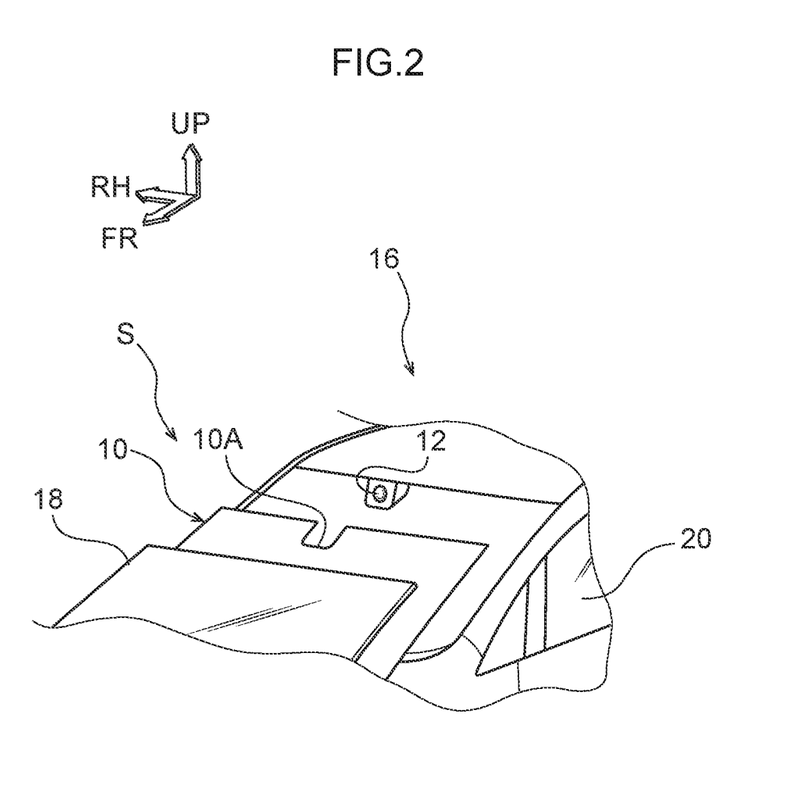
FIG. 2 is an exploded perspective view illustrating front glass, an optical view-shielding device, and a camera of a vehicle optical view-shielding structure according to the present exemplary embodiment.

The optical view-shielding device 10 is a device capable of optically shielding front glass 18, serving as an example of a window, when a vehicle 16 is stationary so as to render the inside of the vehicle difficult to see from outside of the vehicle. As illustrated in FIG. 2, the optical view-shielding device 10 is a transparent liquid crystal display, for example, and is provided superimposed on the vehicle interior side of the front glass 18. Displaying a concealing color, pattern, or the like on the transparent liquid crystal display enables the inside of the vehicle to be rendered difficult to see from outside of the vehicle through the front glass 18. The transparent liquid crystal display is transparent when not activated.

Note that a stationary state of the vehicle 16 is a state in which the vehicle 16 is stationary and not ready to move. In cases in which the vehicle 16 has an automatic transmission, this refers to a state in which a shift lever is in a parking position (P range) and a parking brake has been activated. In cases in which the vehicle 16 has a manual transmission, this refers to a state in which the shift lever is in neutral, and the parking brake has been activated.

The optical view-shielding device 10 optically shields the front glass 18, with the exception of in an imaging range of the camera 12. Specifically, for example, a cutout portion 10A is provided in the optical view-shielding device 10. The cutout portion 10A is provided at a location overlapping the imaging range of the camera 12. In other words, the optical view-shielding device 10 is not present between the front glass 18 and the camera 12. Thus, the imaging range of the camera 12 is not optically shielded, even when the optical view-shielding device 10 has been activated so as to optically shield the front glass 18.

Note that a configuration may be applied in which the optical view-shielding device 10 is not provided with the cutout portion 10A. In such cases, it is sufficient that the portion of the optical view shielding device 10 that overlaps the imaging range of the camera 12 is not optically shielded, or the degree of optically shielding is lessened, when the optical view-shielding device 10 is activated. The optical view-shielding device 10 may also be applied to other windows, such as side glass 20 or rear glass (not illustrated in the drawings), as appropriate. The optical view-shielding device 10 is not limited to a transparent liquid crystal display, and may employ another configuration capable of optically shielding a window, such as a curtain or a shade.

Figure 6:
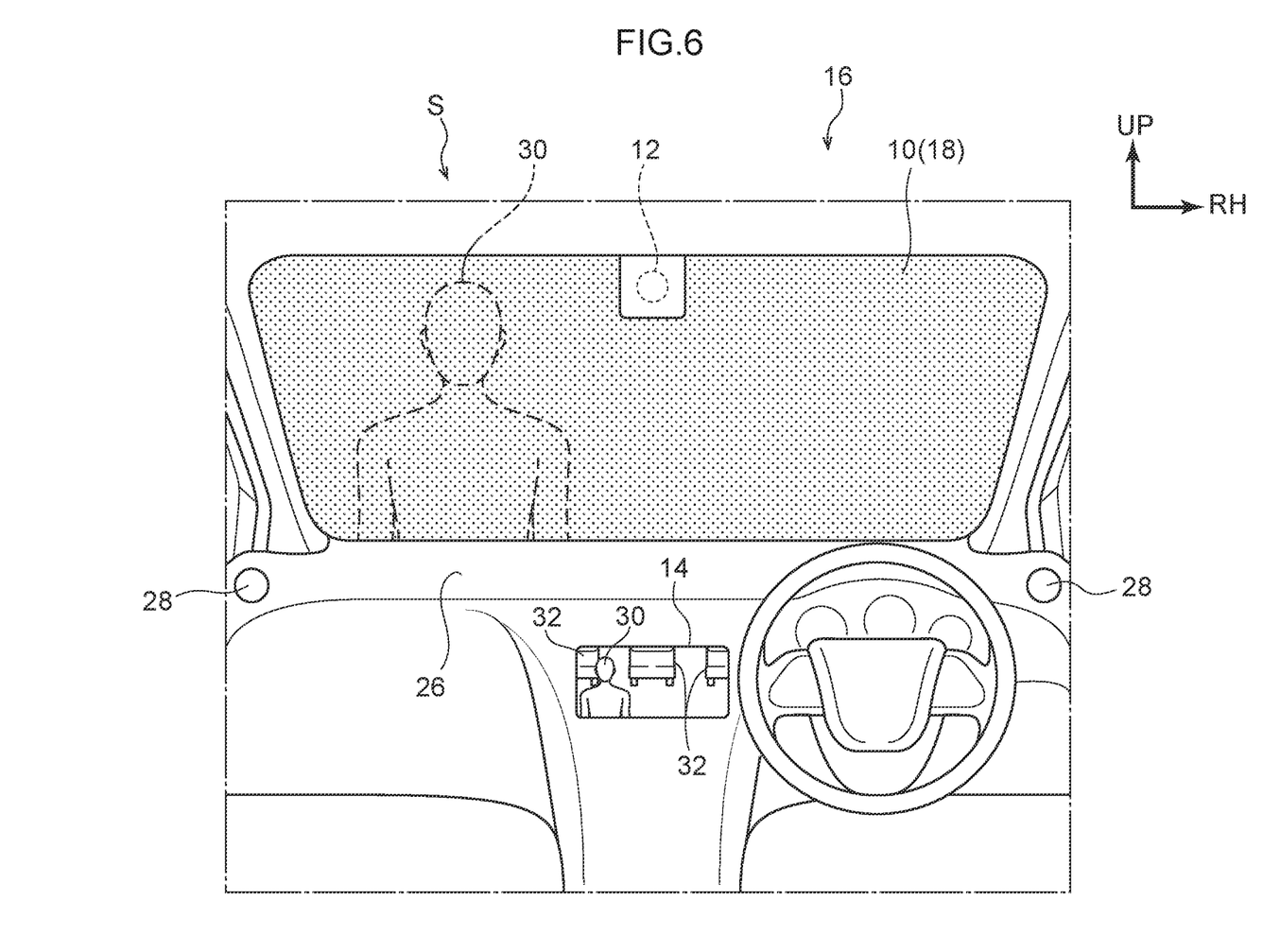
FIG. 6 is a face-on view corresponding to the state in FIG. 5, illustrating a state in which an approaching object has been detected and a situation outside the vehicle, including the approaching object, is displayed on a display.
Figure 7:
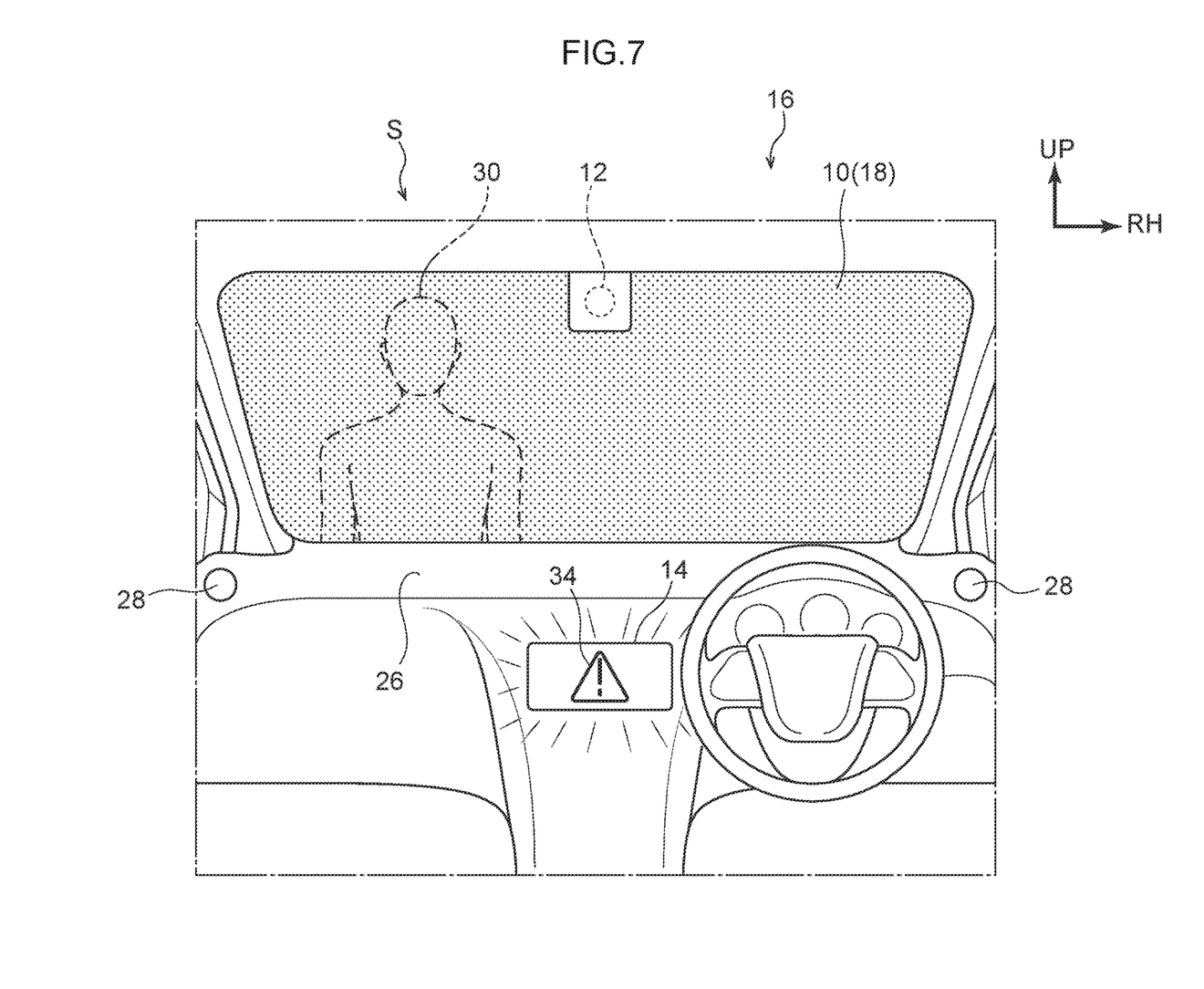
FIG. 7 is a face-on view corresponding to the state in FIG. 5, illustrating a state in which an approaching object has been detected and a warning is being displayed on a display.

The camera 12 is an imaging device that captures images the outside of the vehicle from inside the vehicle, and is capable of detecting an approaching object 30 approaching the vehicle 16 from a captured video image. Although the camera 12 is provided at the center of an upper portion of the front glass 18 as an example, the camera 12 may be provided at another position. The approaching object 30 may be a person as illustrated in the examples of FIG. 6 and FIG. 7, but may also be another vehicle or an animal. A camera (not illustrated in the drawings) that images at the vehicle rear or at a side of the vehicle may be provided as an external detection device.

Figure 3:
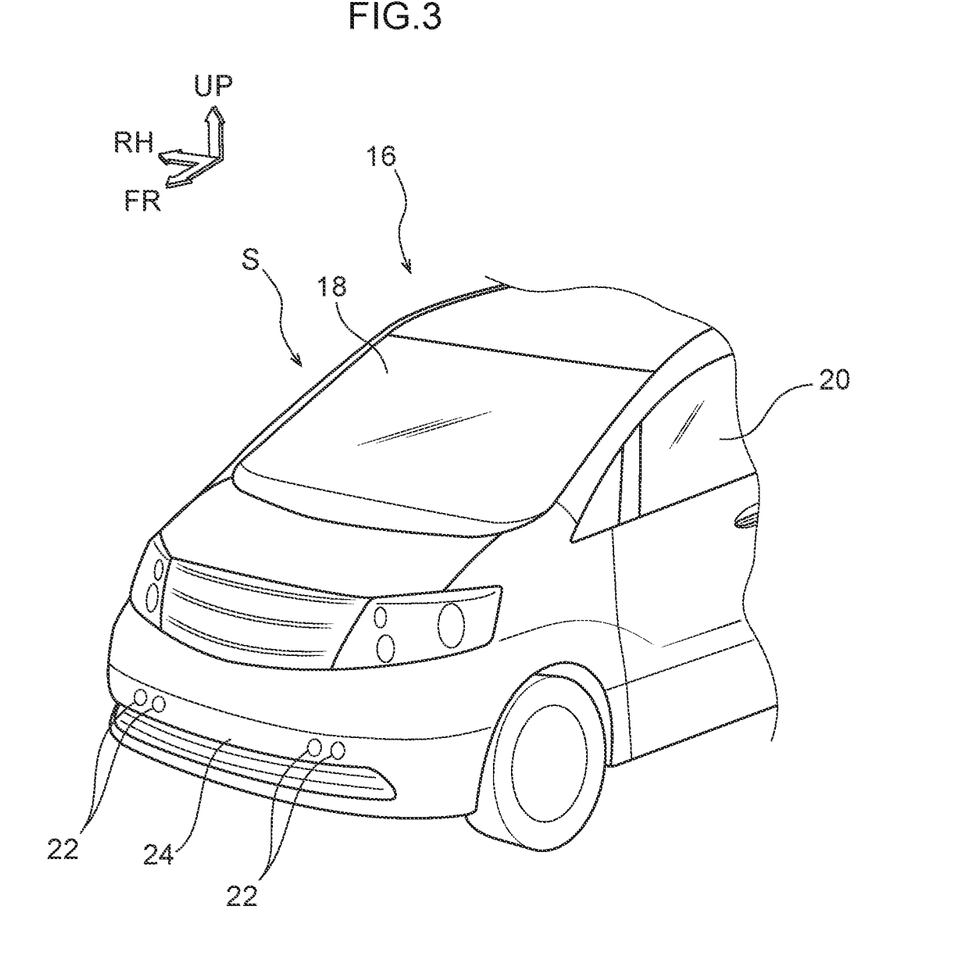
FIG. 3 is a diagram illustrating a vehicle provided with motion sensors that serve as external detection devices of a vehicle optical view-shielding structure according to the present exemplary embodiment.

The external detection device is not limited to the camera 12, and may be configured by motion sensors 22 as illustrated in FIG. 3. The motion sensors 22 are capable of detecting an approaching object 30 approaching the vehicle 16 using infrared rays, ultrasound, visible light, or the like. The motion sensors 22 are provided to a bumper 24, for example. Note that a combination of plural types of external detection device, such as the camera 12 and the motion sensors 22, may be applied.

The display 14 illustrated in FIG. 4 to FIG. 7 is an example of a notification device that issues a notification inside the vehicle notifying that an approaching object 30 has been detected by the camera 12, and is provided to an instrument panel 26, for example. The display 14 is a warning display section inside the vehicle. The display 14 may be jointly employed as a display section of a car navigation device or the like, or may be a dedicated warning display section.

Note that the warning display section serving as a notification device is not limited to the display 14, and may be a warning light or the like that visually alerts an occupant (not illustrated in the drawings). The warning display section may change the color of the vehicle interior lighting. Alternatively, the notification device may audibly alert the occupant using a warning sound generation section 28 or the like, or may alert the occupant by touch using a vibrator or the like (not illustrated in the drawings). Namely, any method may be employed, as long as the occupant can be notified of the approach of an approaching object 30.

Operation

Figure 4:
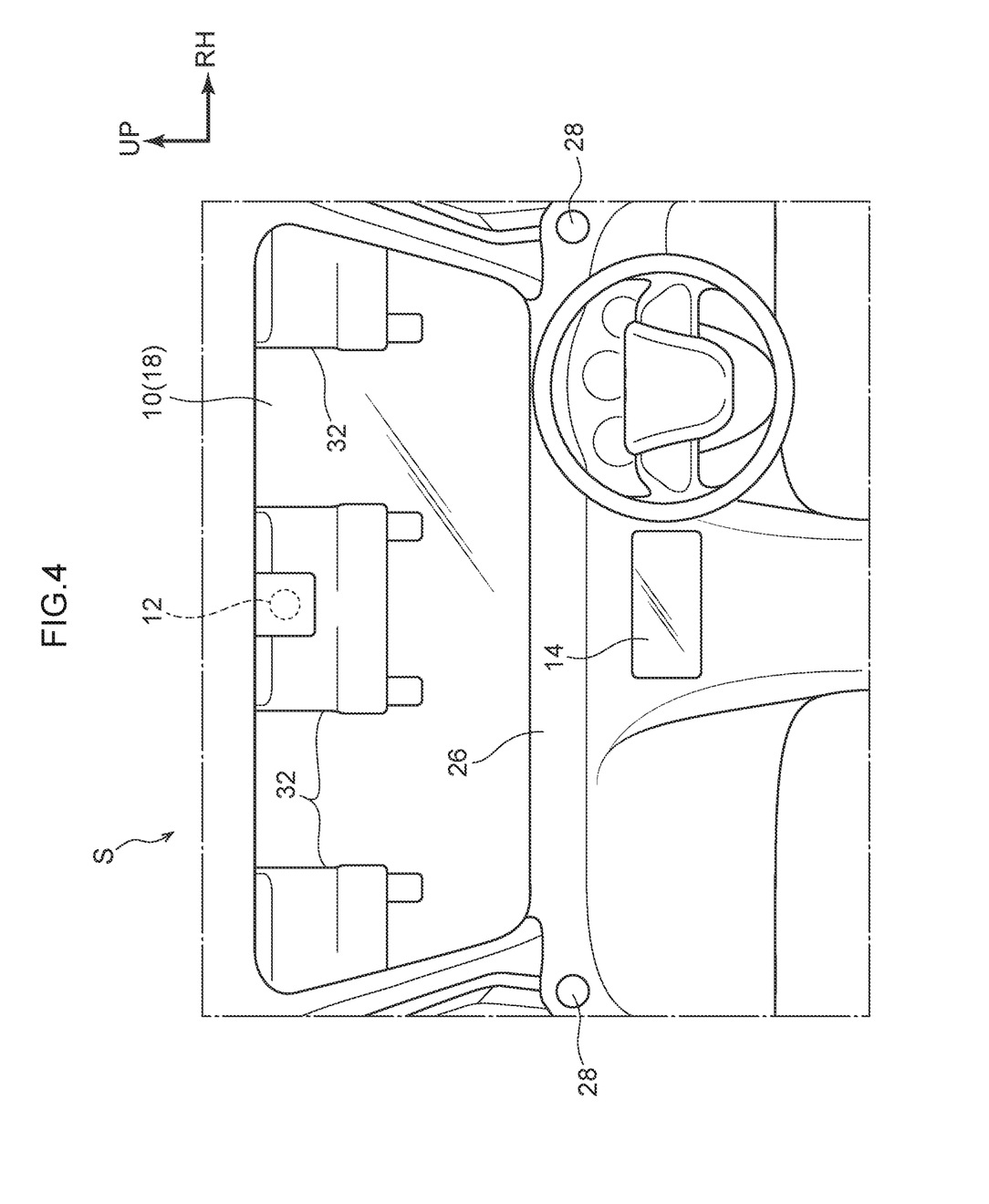
FIG. 4 is a face-on view looking ahead of a vehicle as viewed from inside the vehicle, illustrating a state in which an, optical view-shielding device is not activated.

Explanation follows regarding operation of the present exemplary embodiment configured as described above. In the vehicle optical view-shielding structure S according to the present exemplary embodiment as illustrated in FIG. 4, the outside of the vehicle can be seen from the inside of the vehicle through the front glass 18 when the optical view-shielding device 10 is inactive. Thus, for example, from inside the vehicle, an occupant can see other vehicles 32 in front of their vehicle through the front glass 18. The inside of the vehicle can also be seen from outside the vehicle. Accordingly, the vehicle 16 can be employed as normal for driving and so on.

Figure 5:
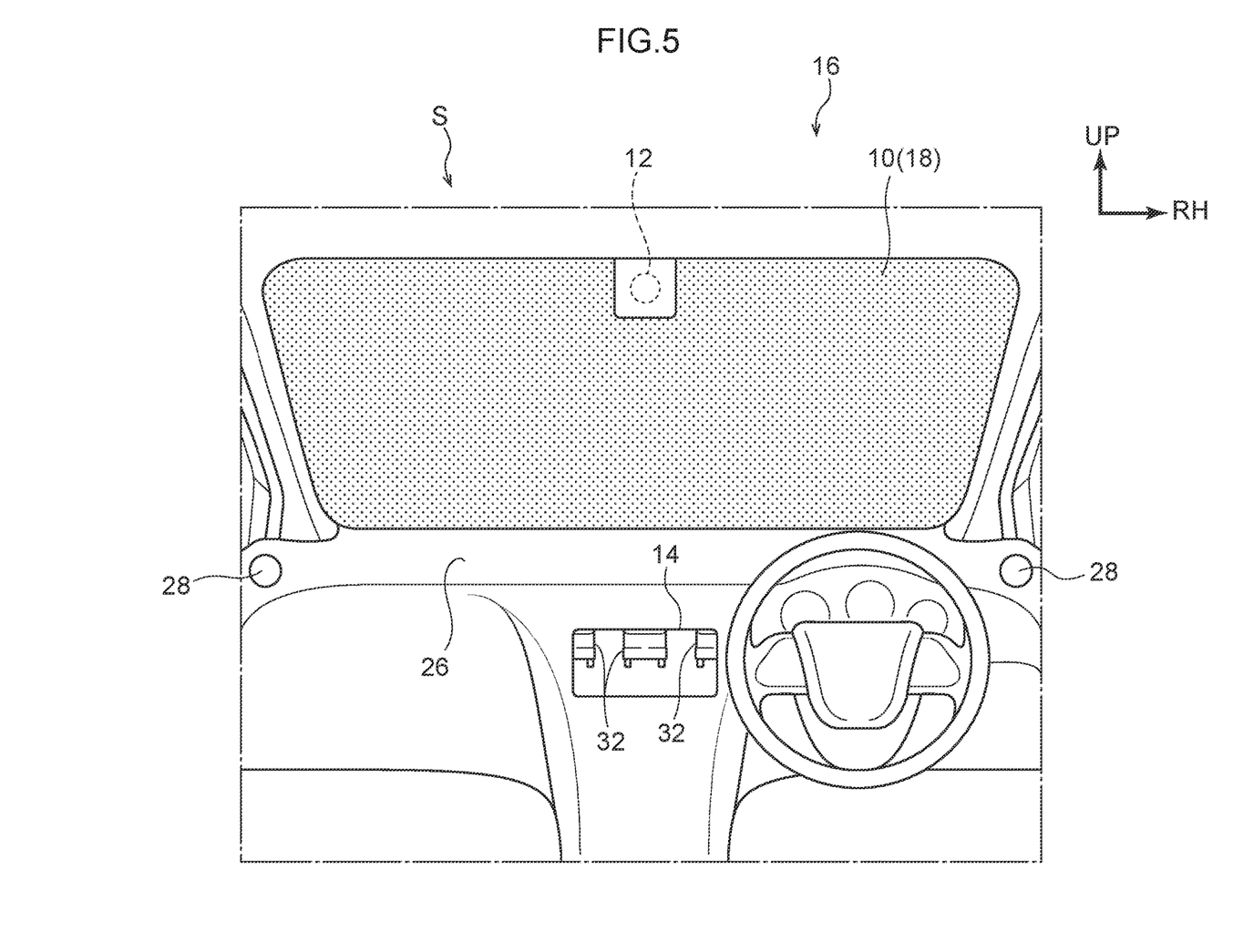
FIG. 5 is a face-on view looking ahead of a vehicle as viewed from inside the vehicle, illustrating a state in which an optical view-shielding device is activated.

In the present exemplary embodiment as illustrated in FIG. 5, when the front glass 18 is optically shielded by the optical view-shielding device 10 while the vehicle 16 is stationary, the outside of the vehicle is rendered difficult to see from inside the vehicle through the front glass 18, and the inside of the vehicle is rendered difficult to see from outside of the vehicle through the front glass 18. In the present exemplary embodiment, even though an occupant is unable to observe the situation outside the vehicle through the front glass 18, the optical view-shielding device 10 is capable of detecting an approaching object 30 approaching the vehicle 16 with the external detection device, such as the camera 12, the motion sensors 22, or the like, and capable of issuing a notification inside the vehicle with the notification device, such as the display 14 (warning display section), the warning sound generation, section 28, or the like. Namely, the occupant is able to observe the situation outside the vehicle with respect to approaching objects 30 even when the optical view-shielding device 10 has been activated.

Specifically, in cases in which the external detection device includes the camera 12, a video image captured by the camera 12 can be displayed on the display 14. For example, as illustrated in FIG. 5, other vehicles 32 parked in front of the vehicle can be displayed on the display 14. Note that it is possible to visually check in front of the vehicle through the front glass 18 when the optical view-shielding device 10 is not activated, and so configuration may be made such that a video image captured by the camera 12 is not displayed on the display 14 when the optical view-shielding device 10 is not activated.

As illustrated in FIG. 6, when an approaching object 30 is approaching the vehicle 16, a video image thereof is captured by the camera 12 and displayed on the display 14. As illustrated in FIG. 2, the cutout portion 10A is provided to the optical view-shielding device 10. Thus, the optical view-shielding device 10 optically shields the front glass 18 with the exception of in the imaging range of the camera 12, thereby enabling the camera 12 to detect the approaching object 30 even in a state in which the front glass 18 is optically shielded by the optical view-shielding device 10.

In cases in which a camera (not illustrated in the drawings) that images at the vehicle rear is also provided as an external detection device, the display on the display 14 may be split such that a video image corresponding to the vehicle front side and a video image corresponding to the vehicle rear side are displayed at the same time. Moreover, the direction from which the approaching object 30 is approaching may be detected by the motion sensors 22 or the like, and a video image corresponding to this direction may be displayed on the display 14.

As illustrated in FIG. 7, a warning 34 may be displayed on the display 14 instead of displaying the approaching object 30. Alternatively, a warning sound may be emitted from the warning sound generation section 28 in addition to the display on the display 14. Alternatively, a warning sound may be emitted from the warning sound generation section 28 without employing the display 14 to notify of the approach of the approaching object 30 inside the vehicle. Namely, the warning sound generation section 28 or the display 14 (warning display section) may be used individually, or may both be used in tandem. Alternatively, a warning light (not illustrated in the drawings) serving as a warning display section may be illuminated or made to flash, or the color of the vehicle interior lighting may be changed, as alternatives to a display using the display 14.

The present exemplary embodiment thus enables an occupant inside the vehicle to be clearly notified of the presence of an approaching object 30 approaching the vehicle 16. This enables the occupant inside the vehicle to feel at ease when utilizing the vehicle interior when the vehicle is stationary, without worrying about being seen by people outside the vehicle. Specifically, for example, the occupant is able to feel at ease when reading in the vehicle interior while waiting to pick somebody up. A crime-prevention effect is also obtained.

Other Exemplary Embodiments

An example of an exemplary embodiment of the present disclosure has been given above; however, exemplary embodiments of the present disclosure are not limited to the above, and various other modifications may obviously be implemented within a range not departing from the spirit of the present disclosure.

What is claimed is:

1. A vehicle optical view-shielding structure comprising:
   a transparent liquid crystal display that is capable of optically shielding a window when a vehicle is stationary, the transparent liquid crystal display is switchable between an inactivated state and an activated state, in the inactivated state the transparent liquid crystal display is transparent and in the activated state the transparent liquid crystal display displays a color or pattern to inhibit seeing a vehicle interior from outside the vehicle;
   an external detection sensor that detects an approaching object approaching the vehicle; and
   a notification device that includes at least one of a warning sound generation section that issues an audio warning inside the vehicle and a warning display section that issues a visual warning inside the vehicle, the notification device issues the audio warning inside the vehicle or the visual warning inside the vehicle notifying that the approaching object has been detected by the external detection sensor when the transparent liquid crystal display is in the activated state.

2. The vehicle optical view-shielding structure of claim 1, wherein:
   the external detection sensor is a camera that captures images outside the vehicle, from inside the vehicle; and
   the transparent liquid crystal display optically shields the window with the exception of an imaging range of the camera in the activated state.

3. The vehicle optical view-shielding structure of claim 1, wherein the external detection sensor is a motion sensor.

4. The vehicle optical view-shielding structure of claim 1, wherein:
   the external detection sensor is a camera that images outside the vehicle from inside the vehicle; and
   the transparent liquid crystal display includes a cutout portion that is provided at a location overlapping an imaging range of the camera.

5. A vehicle optical view-shielding structure comprising:
   a transparent liquid crystal display that is capable of optically shielding a window when a vehicle is stationary, the transparent liquid crystal display is switchable between an inactivated state and an activated state, in the inactivated state the transparent liquid crystal display is transparent and in the activated state the transparent liquid crystal display displays a color or pattern to inhibit seeing a vehicle interior from outside the vehicle;

an external detection sensor that detects an approaching object approaching the vehicle; and a warning sound generation section that issues an audio warning inside the vehicle, the warning sound generation section issues the audio warning inside the vehicle notifying that the approaching object has been detected by the external detection sensor when the transparent liquid crystal display is in the activated state.

6. The vehicle optical view-shielding structure of claim 5, wherein:

the external detection sensor is a camera that captures images outside the vehicle, from inside the vehicle; and the transparent liquid crystal display optically shields the window with the exception of an imaging range of the camera in the activated state.

7. The vehicle optical view-shielding structure of claim 5, wherein the external detection sensor is a motion sensor.

8. The vehicle optical view-shielding structure of claim 5, wherein:

the external detection sensor is a camera that images outside the vehicle from inside the vehicle; and the transparent liquid crystal display includes a cutout portion that is provided at a location overlapping an imaging range of the camera.

9. A vehicle optical view-shielding structure comprising:

a transparent liquid crystal display that is capable of optically shielding a window when a vehicle is stationary, the transparent liquid crystal display is switchable between an inactivated state and an activated state, in the inactivated state the transparent liquid crystal display is transparent and in the activated state the transparent liquid crystal display displays a color or pattern to inhibit seeing a vehicle interior from outside the vehicle;

an external detection sensor that detects an approaching object approaching the vehicle; and a display that issues a notification inside the vehicle notifying that the approaching object has been detected by the external detection sensor when the transparent liquid crystal display is in the activated state.

10. The vehicle optical view-shielding structure of claim 9, wherein:

the external detection sensor is a camera that captures images outside the vehicle, from inside the vehicle; and the transparent liquid crystal display optically shields the window with the exception of an imaging range of the camera in the activated state.

11. The vehicle optical view-shielding structure of claim 9, wherein the external detection sensor is a motion sensor.

12. The vehicle optical view-shielding structure of claim 9, wherein:

the external detection sensor is a camera that images outside the vehicle from inside the vehicle; and the transparent liquid crystal display includes a cutout portion that is provided at a location overlapping an imaging range of the camera.

* * * * *

UNITED STATES PATENT AND TRADEMARK OFFICE
CERTIFICATE OF CORRECTION

PATENT NO. : 10,802,370 B2
APPLICATION NO. : 16/229803
DATED : October 13, 2020
INVENTOR(S) : Atsuko Kobayashi et al.

It is certified that error appears in the above-identified patent and that said Letters Patent is hereby corrected as shown below:

On the Title Page

Item (72), inventor 1, city, delete "Nagoya" and insert --Nagoya-shi Aichi-ken--, therefor.

Item (72), inventor 2, city, delete "Anjo" and insert --Anjo-shi Aichi-ken--, therefor.

Item (72), inventor 3, city, delete "Toyota" and insert --Toyota-shi Aichi-ken--, therefor.

Item (72), inventor 4, city, delete "Okazaki" and insert --Okazaki-shi Aichi-ken--, therefor.

In the Specification

In Column 2, Line(s) 6, after "transmission", insert --,--.

In Column 3, Line(s) 14, after "an", delete ",".

In Column 4, Line(s) 7, delete "view shielding" and insert --view-shielding--, therefor.

In Column 5, Line(s) 19, after "generation", delete ",".

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*